United States Patent Office 3,341,314
Patented Sept. 12, 1967

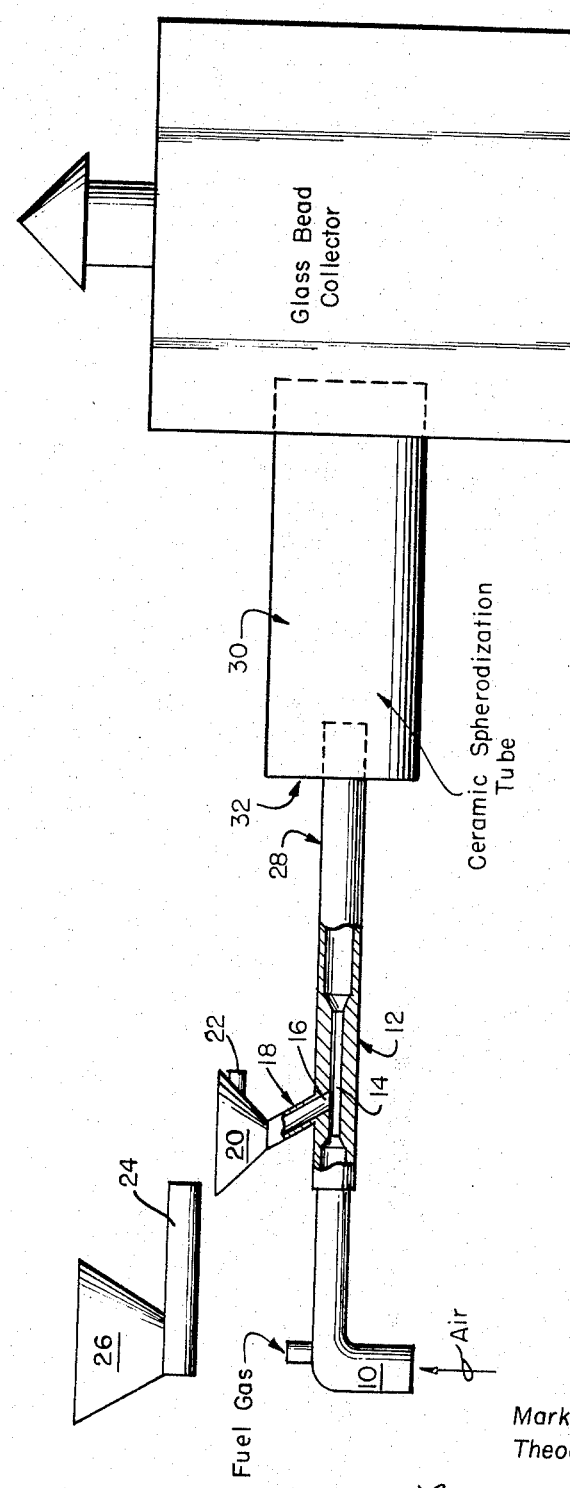

3,341,314
GLASS BEAD MAKING APPARATUS
Mark S. Vukasovich, Parma, and Theodore M. Harkulich, Cleveland, Ohio, assignors to Horizons Incorporated, Cleveland, Ohio, a corporation of New Jersey
Filed May 9, 1963, Ser. No. 279,205
1 Claim. (Cl. 65—142)

This invention relates to an apparatus for producing high quality glass spheres in substantially quantitative yield from finely divided glass cullet. More particularly it relates to improvements in the production of uniformly sized glass beads and hollow glass spheres quantitatively from finely divided glass particles.

Various methods have been developed for the production of glass beads from finely divided glass cullet. One approach exemplified in United States Patents 2,334,578, 2,619,776 and 2,794,301 involves the feeding of ground glass, air and gaseous fuel into a vertically positioned burner from which a flame carrying the glass particles issues upwardly. The mixture of fuel and air is proportioned so as to insure that the flame temperature is sufficiently high that the glass particles soften or melt in the flame and assume a spherical shape. In vertical bead making apparatus of the type indicated, the patentees rely principally on the fluidizing action of the upwardly directed gas stream to maintain the glass cullet in the hot zone for a proper length of time. In vertical devices of this type, in actual practice the particles collide with one another to an appreciable extent and lose their spherical shape and adhere to one another and form larger agglomerates. In addition a build up of glass on the walls of the apparatus invariably occurs. In an effort to avoid these difficulties various materials have been added to the flame.

Another apparatus which has been suggested is one in which the flame is positioned horizontally. One such apparatus is described in Belgium Patent 495,779 in which an apparatus and method are described involving the feeding of finely divided glass particles directly into a flame. In apparatus of this type there is a pronounced tendency for the glass particles to fuse so rapidly that they collect at the base of the feeder and soon clog the apparatus.

A principal disadvantage of the prior art described is that in spite of controlling the various aspects of the process by means of refinements in already costly and complex apparatus, it has been found that a high proportion of finished product is obtained in an angular and spheroid form, with high and unevenly distributed gas content and with a substantial portion of beads which are fused together.

This condition is so prevalent that the United States Government has a specification for glass beads to be used in blasting equipment as a cleaning and peening material issued by the U.S. Air Force as MIL–A–9954 USAF which is as follows:

(1) Size:

| Sieve Size | Grade A, Percent Passing | Grade B, Percent Passing | Grade C, Percent Passing |
|---|---|---|---|
| 40 | | | |
| 45 | | | 100. |
| 70 | | 100 | 95 min. |
| 80 | | 95 min | |
| 140 | 100 | | 6 max. |
| 170 | 94 min | 6 max | |
| 400 | 7 max | | |

(2) Quality:
 (a) Grade A and B shall be at least 97% spherical and C at least 90%. No more than 3% shall be scored, ovate, broken, fused, elongated or irregular shapes for all glass beads.
 (b) All classes shall have no more than 10% gas inclusions.
(3) Specific gravity: [1]
 The specific gravity of the glass beads shall be not less than 2.3.

[1] The specific gravity is an indication of the extent of gassing, i.e. the presence of gas bubbles in the glass beads.

A principal object of the present invention is to provide a simple apparatus wherein glass beads meeting the above specifications can be prepared in quantitative yields from glass cullet ranging in particle size from minus 100 mesh to +325 mesh (Tyler Standard) and with bulk flame temperatures as low as 1800° F.

Other objects will become apparent from the description which follows taken in conjunction with the single sheet of drawings accompanying this specification.

As shown in the diagrammatic representation comprising the single figure of the drawings, the bead forming device of this invention comprises mainly two components: (1) a specially designed burner-nozzle which incorporates a feeding system and (2) a spherodization tube.

The bead making apparatus includes an air-fuel gas mixer system shown generally at 10. Any of the presently known air-gas mixing devices may be utilized provided that it delivers a mixture in the required amounts and at the required velocity to insure that the flow within the spherodization tube is laminar.

The mixture of fuel gas and air is delivered to a horizontally disposed feeder tube 12 having a venturi section 14 which contains a port 16 to receive a glass cullet feeding conduit 18 leading from a hopper 20 to the throat of the venturi section 14 in the feeder tube. A vibrator 22 may be attached to the hopper to prevent clumping and to insure a continuous flow of cullet into tubes 18 and 12.

A conventional feeder 24 furnishes cullet from a main supply bin 26 to hopper 20.

After the venturi section 14 tube 12 resumes a uniform diameter and terminates in a section 28 which extends into the spherodization tube 30.

Conversion of the cullet into spherical beads occurs in tube 30 and from this tube the beads pass into a collector of conventional construction.

It is believed that the operation of the apparatus will be evident from the above description, and is as follows:

The glass cullet is fed into the system by any of several common means and preferably in conjunction with a vibratory feeder as shown. The glass cullet flows into the venturi section wherein the cullet is injected into the air-fuel mixtures just prior to combustion. This avoids cullet build-up in the system and avoids the use of improper air-gas ratios as is often the case when the cullet is introduced into the air line in the manner commonly practiced with vertical burners. The cullet is then carried by the air-gas mixture through the prolongation of the tube in which section the mixture becomes greatly dispersed. As the mixture of air, gas and glass particles leaves section 28, it enters the spherodization tube 30. Combustion of the air and gas occurs in tube 30 and the glass particles are rapidly heated to between 2000 and 2500° F. and become spheres as they pass through the ceramic tube 30. From tube 30 the spheres flow into a collector wherein the solid spheres are separated from the gaseous combustion products in a conventional manner.

The function of the tube 30 is to maintain the glass particles in the hot zone for a time interval which is sufficient for the particles to become completely spherodized. Particle spherodization with the tube is 100% complete. Without it, only 60 to 80% of the particles are spherodized under otherwise identical operating conditions.

One possible explanation for the complete spherodization achieved may be as follows: When glass cullet is injected by the gas mixture into the combustion zone, the cullet can follow one of several paths. Most of the cullet will remain in the combustion or hot zone sufficiently long to be completely converted into spheres, although some of the cullet may be swept out of the hot zone by convection currents or flame turbulence before it is completely spherodized. Such cullet is angular or non-spherical in geometry and thereby lowers the spherodization efficiency. The non-spherodized product then must be recirculated through the device for spherodization if it is to meet the military specification noted above. Some cullet, due to the force of gravity, may fall out of the hot zone too soon, again yielding angular or partially spherodized particles. Still other cullet, by virtue of striking one another, may be ejected prematurely from the hot zone or fused to produce spheroids. This phenomenon is most pronounced in a turbulent stream and is aggravated by increasing turbulence. In the present apparatus, the behavior of the cullet is controlled by placing a tube 30 around the burning gases to produce a more laminar flow pattern and to minimize convection and turbulent flow of the burning gases. As a result the cullet appears to remain in the hot zone for a sufficiently long time that it is completely converted into spheres. In addition air inspirated into tube 30 from the atmosphere further aids in producing a laminar flame pattern, retaining the cullet in the high velocity gas stream and minimizing premature cullet ejection by gravity or convection. The stream, being more laminar than it would be in the absence of sleeve 30 produces fewer glass particle collisions both with the wall and with other particles, thus minimizing particle adhesion and build-up on the wall. Unlike many tower devices used in bead production, little or no glass adheres to the hot walls of the tube 30.

In the glass bead making apparatus described, the diameter of tube 30 should be from 4 to 6 times the exit diameter of the nozzle 12. A preferred tube diameter is about 5 times the exit diameter. The length of tube 30 should be at least as long as the flame and up to twice the flame length with a preferred length of 1.5 times the length of the flame.

The tube can be made of any ceramic or metal. In the case of some low softening point metals and ceramic materials, external cooling can be accomplished by gases or liquids passing around the outside of the tube. It has been found that quartz, alumina, and mullite ceramic tubes perform most satisfactorily, and do not require external cooling.

Many bead specifications severely limit the amount of beads with visible gas inclusions. The instant process produces a product having a low degree of gas inclusion content. Gas inclusions result from entrapped air or reaction products in the cullet being expanded to visible size by heating during spherodization. The device normally produces a product having less than 10 percent beads with microscopically visible gas inclusions and usually the gassing content is less than 5 percent.

As in the practice of other known bead making processes it has been found convenient to utilize glasses having alkali contents of 7% or more, one particularly preferred glass being soda lime glass of the type widely used in plate glass, window glass, bottles and commonly available as cullet.

Glass beads produced in the above described apparatus are useful in other applications requiring beads of uniform sphericity and size such as filters, burnishing material, reflectors in highway paints, motion picture screens and other applications which will readily suggest themselves to persons having a need for uniform glass beads.

In a laboratory test, an apparatus in which sleeve 30 had a diameter of 1.25 inches and a length of 5 inches, and the venturi throat and diameter of tube 18 were each 0.1695 inch and the exit diameter of tube 28 was 0.250 inch, using oxygen and natural gas, a production rate of approximately one pound per hour was achieved.

The said apparatus has been scaled up to produce about 10 pounds of beads per hour using air and natural gas and has been operated for runs of long duration without experiencing any build up of glass on the inside of sleeve 30 and with substantially quantitative yields of beads meeting the above noted military specification in every respect.

Having now described the invention in its preferred form it is not intended that it be limited except as required by the appended claim.

We claim:
A glass bead making apparatus which comprises:
means for forming a flowing stream from a combustible mixture of air and gaseous fuel;
a horizontal tube for conducting said flowing stream from the entry end of said horizontal tube into a horizontally disposed combustion zone at the exit end of said tube, said tube including a venturi section intermediate the ends of said tube;
means for feeding glass cullet into said tube and into said flowing stream at the throat of said venturi section;
and a horizontal sleeve defining a combustion zone, said sleeve being disposed about the exit end of said horizontal tube whereby the resulting flowing stream comprising a mixture of fuel, air and glass cullet is confined by said sleeve and is caused to flow in a more laminar and less turbulent flow pattern during the combustion of said fuel in said sleeve whereby the cullet is heated and forms spherical beads while it passes along the bore of said sleeve the diameter of said sleeve being between about 4 and 6 times the diameter of said horizontal tube at its exit end and the length of said sleeeeve being about 1.5 times the length of the combustion zone in said sleeve.

References Cited

UNITED STATES PATENTS

| | | | |
|---|---|---|---|
| 2,421,902 | 6/1947 | Neuscholtz | 65—21 |
| 2,619,776 | 12/1952 | Potters | 65—21 |
| 2,794,301 | 6/1957 | Law et al. | 65—21 |

FOREIGN PATENTS

| | | |
|---|---|---|
| 495,779 | 9/1950 | Belgium. |
| 1,161,396 | 8/1958 | France. |

DONALL H. SYLVESTER, *Primary Examiner.*

G. R. MYERS, *Assistant Examiner.*